United States Patent
Griffin et al.

(10) Patent No.: US 6,754,201 B1
(45) Date of Patent: Jun. 22, 2004

(54) COMMUNICATION SYSTEM USING LINE APPEARANCES ON A SINGLE LINE FOR CONNECTING MULTIPLE DEVICES

(75) Inventors: Shawn Griffin, Ottawa (CA); Sonya Fullarton, Ottawa (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/563,879

(22) Filed: May 3, 2000

(30) Foreign Application Priority Data

May 11, 1999 (GB) .............................................. 9910957

(51) Int. Cl.$^7$ .............................................. H04L 12/66
(52) U.S. Cl. ...................... 370/352; 370/401; 370/466
(58) Field of Search ................................ 370/351, 352, 370/355, 356, 401, 466

(56) References Cited

U.S. PATENT DOCUMENTS

| | | | |
|---|---|---|---|
| 5,649,005 A | | 7/1997 | Lynch et al. |
| 6,343,086 B1 | * | 1/2002 | Katz et al. ................... 370/489 |
| 6,359,880 B1 | * | 3/2002 | Curry et al. ................. 370/352 |
| 6,363,065 B1 | * | 3/2002 | Thornton et al. ........... 370/352 |

FOREIGN PATENT DOCUMENTS

| | | |
|---|---|---|
| CA | 2024881 | 9/1990 |
| EP | 0176953 | 4/1988 |
| EP | 0711052 | 5/1996 |
| GB | 2326306 | 12/1998 |
| WO | 9743849 | 11/1997 |
| WO | WO 98/23054 | 5/1998 |

\* cited by examiner

*Primary Examiner*—Chau Nguyen
*Assistant Examiner*—Christine Ng
(74) *Attorney, Agent, or Firm*—Jones Day (57) ABSTRACT

A communication system using line appearances to connect multiple devices via a single communication line, comprising a communication device, such as a PBX, for presenting call messages to initiate communications between a plurality of endpoints, a plurality of new communications endpoints having predetermined logical locations, such as IP addresses or directory numbers, and a Gateway connected firstly to the communication device via the single communication line, for carrying TDM signals and being capable of supporting multi-line devices, and secondly to the plurality of new communications endpoints via a LAN, for (i) presenting a multi-line appearance to the communication device, (ii) receiving the call messages and in response (iii) routing calls between the communication device and new communications endpoints by mapping between the line appearances on the communication line and the predetermined logical locations.

6 Claims, 8 Drawing Sheets

COMMUNICATION SYSTEM USING LINE APPEARANCES ON A SINGLE LINE FOR CONNECTING MULTIPLE DEVICES

FIELD OF THE INVENTION

This invention relates in general to communications systems, and more particularly to a method and apparatus for adding communication endpoints to a communication system using multiple line appearances.

BACKGROUND OF THE INVENTION

According to well known traditional communication devices such as PBXs, a communication line must be provided from each communication endpoint (e.g. telephone set, wireless phone, etc.) to the communication device. More recently, Gateways have been used to add new communications endpoints to a communications device using the H.323 communications protocol. H.323 is an emerging standard for multi-media communication. This standard governs communications between terminals and other entities over a packet switched network. As will be understood by a person of ordinary skill in the art, a Gateway is an H.323 device for transparently reflecting the characteristics of a LAN endpoint to an SCN (Switched Circuit Network) endpoint, and vice versa.

Notwithstanding the advantages of utilizing H.323 communication between endpoints, there remains a requirement to provide a communication line from the Gateway to the communication device for each new endpoint added to the system. This results in additional cost in terms of equipment and cabling.

SUMMARY OF THE INVENTION

According to the present invention, a method and apparatus are provided for monitoring calls to an existing communication endpoint-of a line, answering the calls and forwarding the calls to an appropriate one of multiple devices connected to a single communication port on the system by using multiple line appearances.

BRIEF DESCRIPTION OF THE DRAWINGS

A detailed description of the preferred embodiment of the present invention is provided herein below, with reference to the drawings in which.

DETAILED DESCRIPTION OF THE PREFERRED EMBODIMENT

Figure 1:
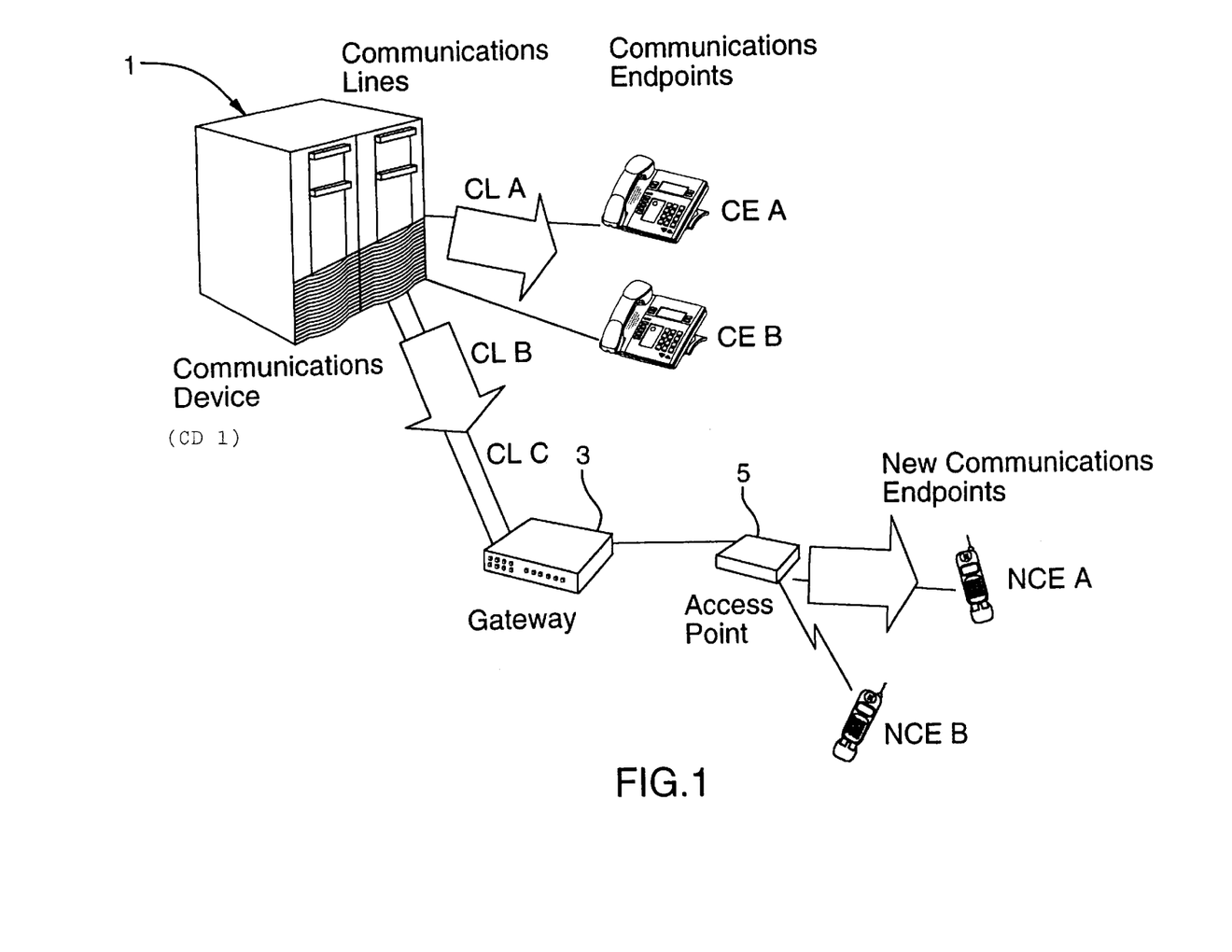
FIG. 1 is a block diagram of a communications system according to a first embodiment of the present invention.

With reference to FIG. 1, a communication system is shown comprising a communications device (CD 1), such as a PBX or KTS, for providing voice and other communications between communications endpoints CE A and CE B via communications lines CL A and CL B, respectively. Typically, many such endpoints are accommodated, although only two are illustrated for ease for explanation. According to the present invention, a Gateway 3 is connected to the Communications Device (CD 1) via a single communications line CL C. New communications endpoints NCE A and NCE B are shown connected to the Gateway 3 via a common Access Point 5, wherein NCE A and NCE B are wireless devices. The Access Point 5 may be eliminated if NCE A and NCE B are not wireless devices. For example, as discussed in greater detail below, where the NCEs are IP telephone sets then they may be connected to the Gateway 3 via a LAN.

According to the present invention, capabilities existing in CD 1 are used to monitor communications to CE A and CE B. Specifically, CD 1 may be configured so that the Gateway 3 is provided with line appearances for endpoints CE A and CE B. This is a very common configuration used in PBXs for attendants, call answering centers and secretaries, etc., whose sets are provided with line appearances for other parties so that the attendants, call answering centers and secretaries, etc. can answer calls on behalf of the other parties. However, according to the present invention, the multi-line appearance is provided at the Gateway 3. The CD 1 communicates with Gateway 3 as if it is a multi-line set. The Gateway, on the other hand, is able to map an incoming call on one of its line appearances to a one of the new communications endpoints (NCE A or NCE B).

Thus, when a call is placed by CD 1 to CE A over CL A, information (e.g. ring_set, display line #, etc.) is also sent over CL C to NCE A. The Gateway 3 receives the information over CL C, and sends a message to CD 1 causing it to route the communication over CL C instead of over CL A to CE A. The Gateway 3 then makes a connection, or routes the communication, to NCE A. If the communication is for CE B, information to that effect is sent over CL C to NCE B in a similar manner, whereupon the Gateway 3 receives the information and causes CD 1 to route the call over CL C for communication with NCE B.

Figure 2:
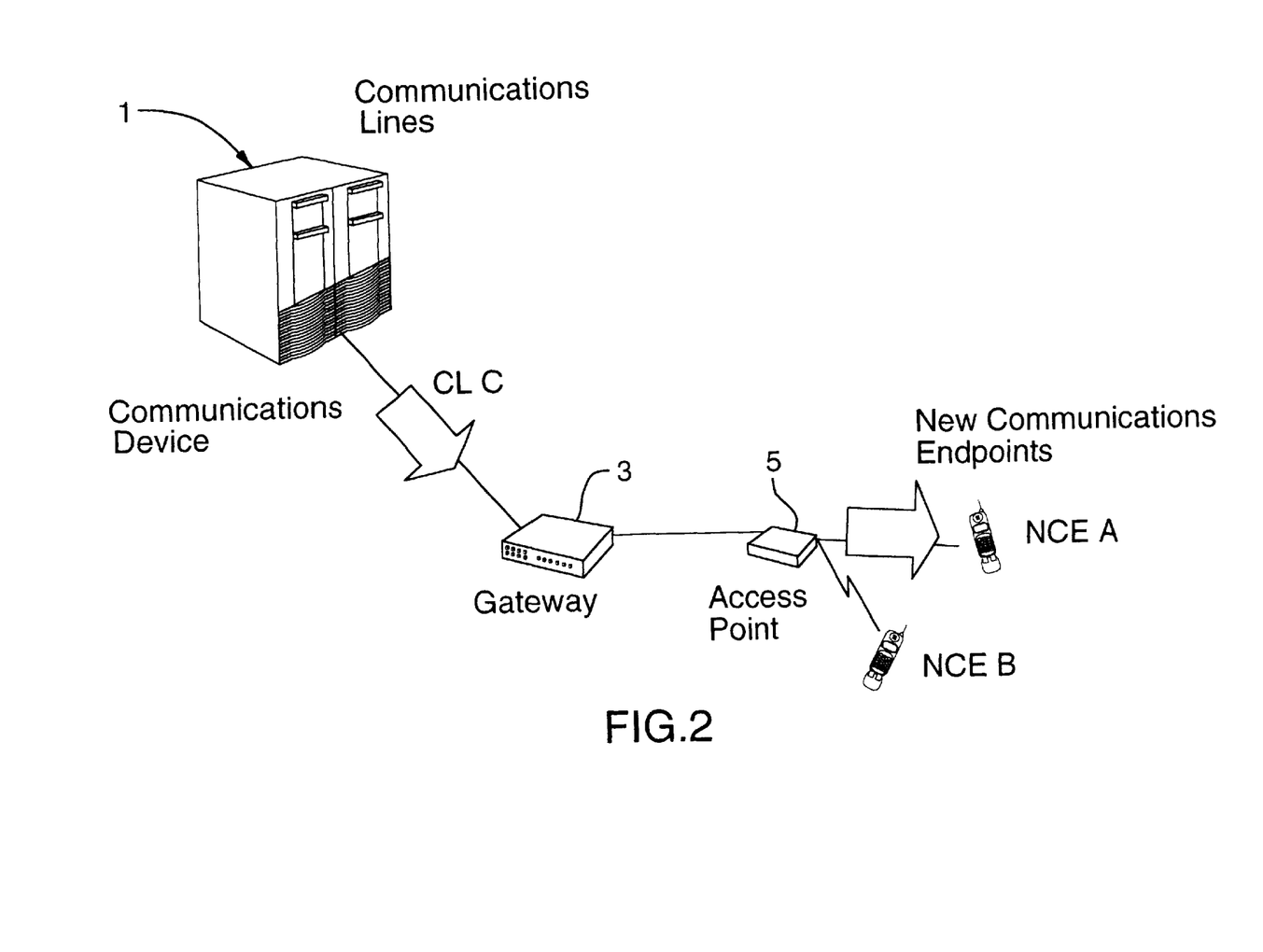
FIG. 2 is a block diagram of a communications system according to a second embodiment of the present invention.

Turning to FIG. 2, the principles of the present invention are applied to a configuration wherein NCE A and NCE B are to be added to the system but there are no pre-existing communication endpoints for association with the NCEs. In this embodiment, information is sent by CD 1 over CL C to the Gateway 3 for indicating that the call should be sent over CL C. The Gateway 3 receives this information and determines that the call is destined for CL C and thereby completes the call routing in a manner similar to that described with reference to FIG. 1 and discussed in greater detail below with reference to FIGS. 6 and 7.

In each of the embodiments of FIGS. 1 and 2 a common technique is employed by which calls for devices are monitored in CD 1 through line appearances and the calls are allocated to specific devices which share a common communication line (CL).

Figure 3:
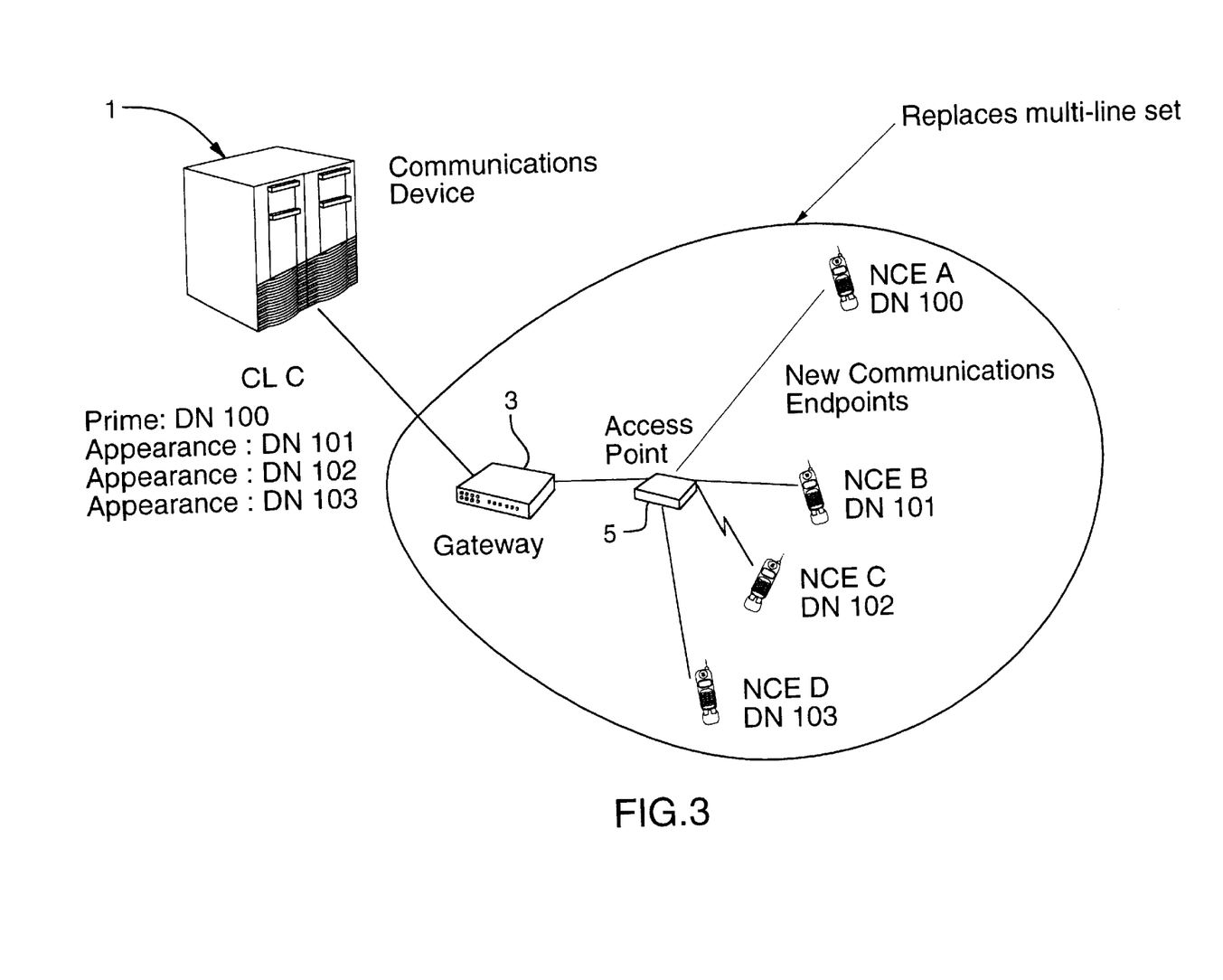
FIG. 3 is a block diagram showing the embodiment of FIG. 2 in greater detail.

The Communications Device (CD 1) of FIGS. 1 and 2 is connected to the Gateway 3 using a line capable of carrying information on calls to more than one Communication Endpoint. For example, CL C can be a line normally used for a multi-line set (e.g. Mitel® SS430), as shown in FIG. 3. The Gateway 3 simulates a set having many line appearances by utilizing a predetermined set protocol which, according to the preferred embodiment, is the Minet™ communication protocol developed by Mitel Corporation. By using the Minet™ protocol, information on all calls to the many lines appearing on a telephone set is made available to the Gateway 3, and the Gateway is thereby able to answer these calls. From the perspective of the PBX (i.e. CD 1), the Gateway 3 appears and behaves as a multi-line set. Communication Line C (CL C) is programmed in the CD 1 as a multi-line device with appearances for each address or directory number which is accessible on that line from the Gateway 3. Accordingly, a single line (CL C) from CD 1 can be used to initiate calls on behalf of any of its line appearances via the Gateway 3.

It is possible, using the line protocol on CL C, to signal which "line appearance" is making or answering a call. For example, if "Button 16" is a line appearance key for a line "3001", then a "Button_16_pressed" message from Gateway 3 to CD 1, using the Minet™ protocol, will result in the call being made on line 3001. Thus, even while a line to CD 1 is in use during a call, information may be received by CD 1 for calls on other line appearances.

Figure 4:
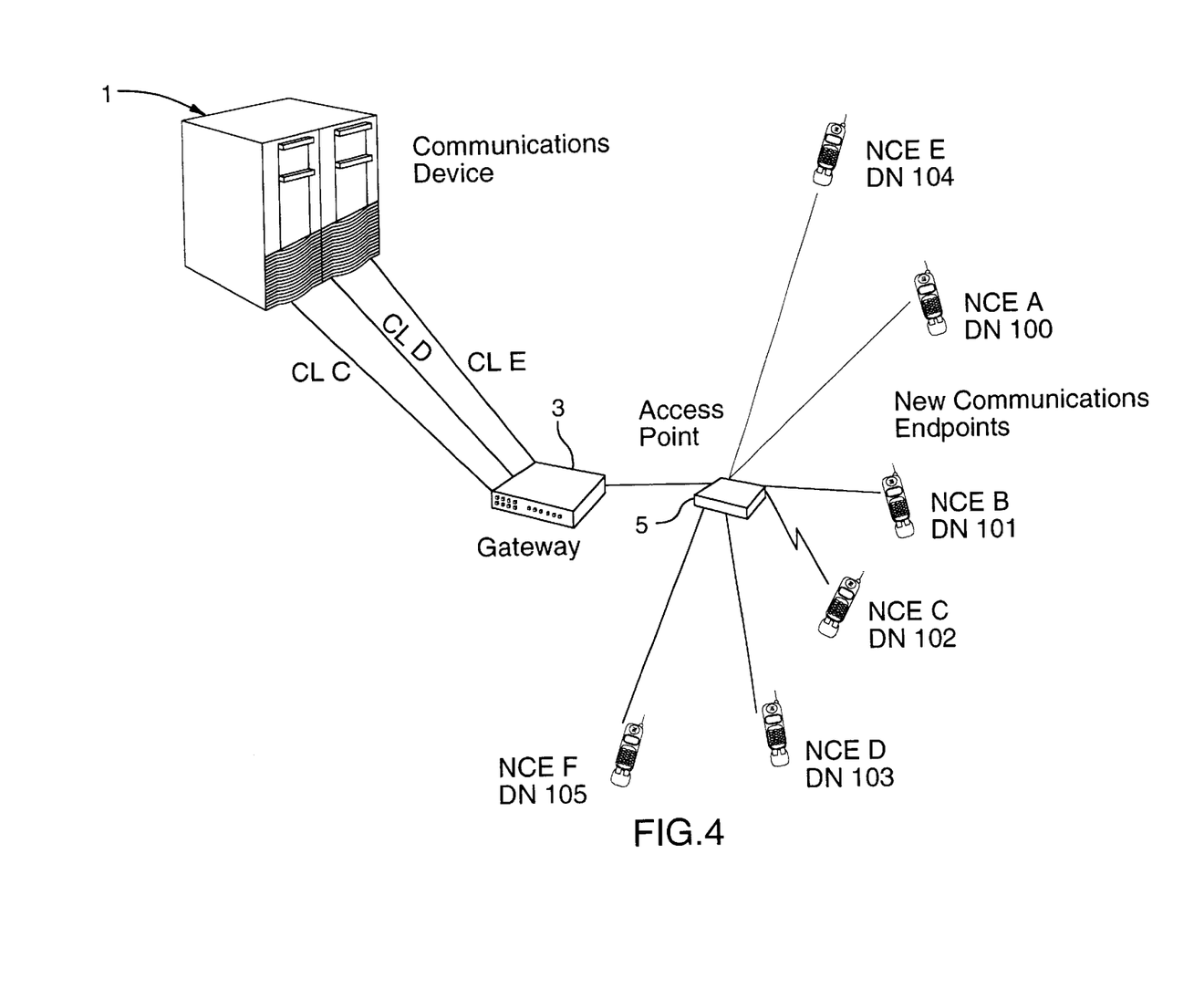
FIG. 4 is a block diagram of an extension of the embodiments shown in FIGS. 2 and 3 with multiple communication lines.
Figure 5:
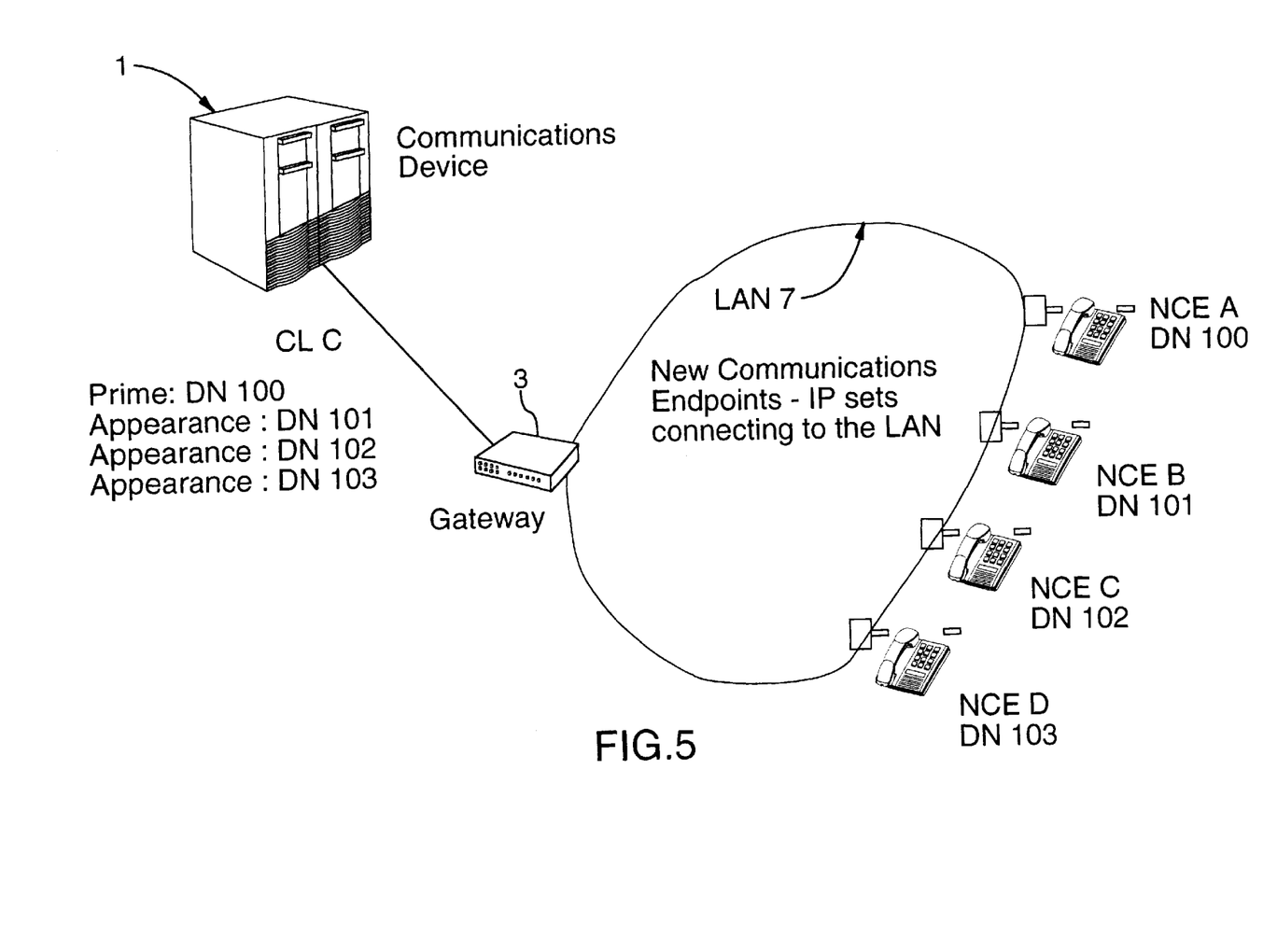
FIG. 5 is a block diagram of a further embodiment for connecting IP sets via a LAN.

By using a small number of "multi-line device" lines between the Gateway 3 and the CD 1, a large number of line appearances can be accessed. FIG. 4 shows three Communication Lines (CL C, CL D, CL E) extending from CD 1 to the Gateway 3. Each line address can appear on more than one line from CD 1 in order to limit congestion. The Gateway 3 monitors each address on one line only, since the information is identical on the other lines. The selection of the line to initiate or answer a call is based on the number of active calls that each line can support, and the number of calls currently active on each line. For example, if NCE B is engaged in a call on CL C, and CL C only supports one connected call, then CL D will be used if a call is initiated from a different NCE. Each of the Communication Lines from CD 1 can have the same line appearances, or each may have a subset of the line appearances. An alternative configuration wherein IP Phones (NCE A through NCE D) are connected to the Gateway 3 via a LAN 7, is shown in FIG. 5.

The implementations discussed above are particularly advantageous for connecting new devices to CD 1 because the new devices do not require the usual additional hardware associated with a line port per device. Wireless and IP devices are exemplary of the sorts of devices which may be added to the system via the Gateway 3, as shown in FIGS. 4 and 5.

Figure 6:
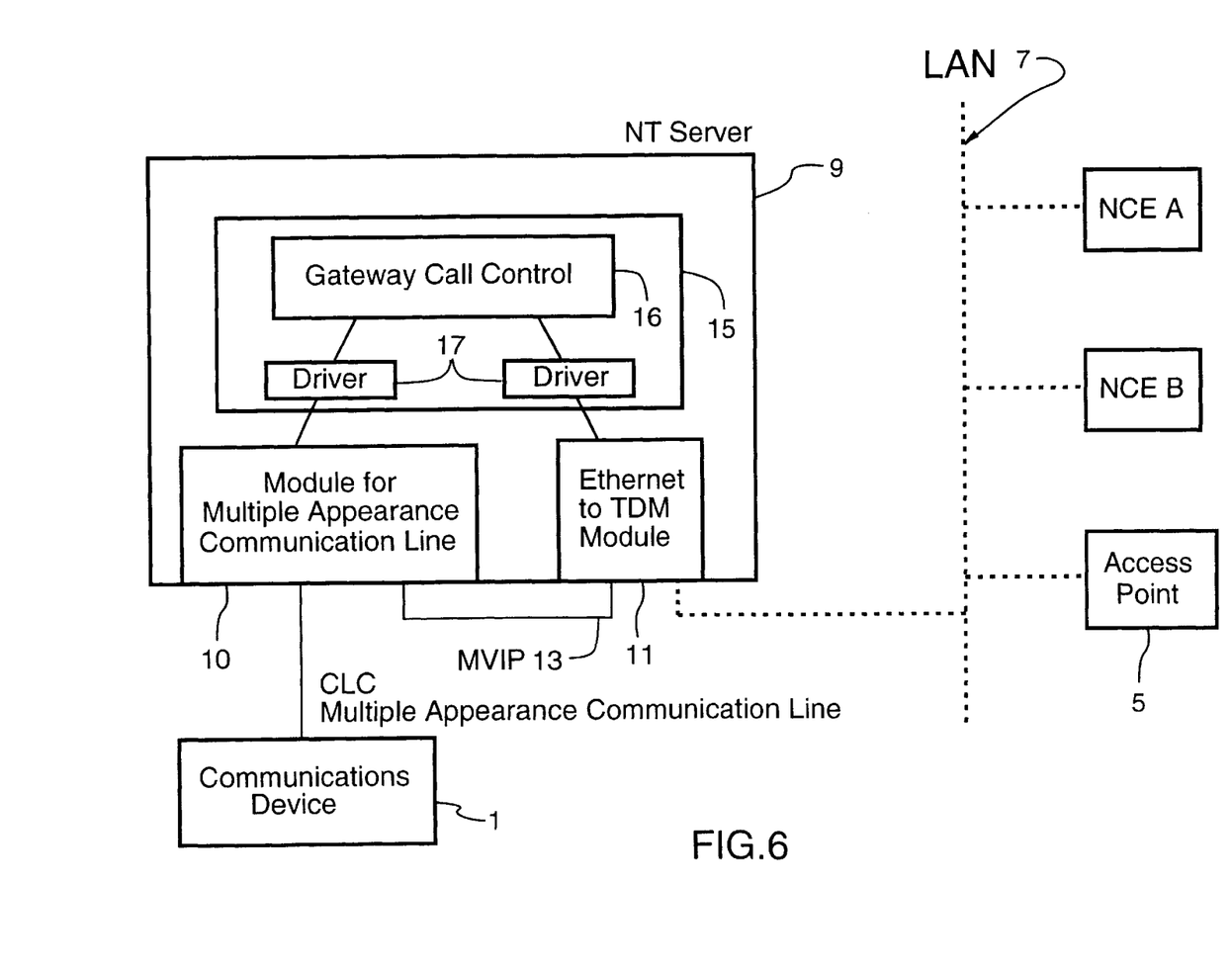
FIG. 6 is a block diagram of hardware and software components of a Gateway server used in the implementations of FIGS. 1 to 5.

Turning to FIG. 6, the hardware components of Gateway 3 are shown. In particular, a PC (NT Server 9) includes modules 10 that are connected to each multiple-appearance communication line (e.g. CLC C) from the Communications Device (CD 1). Only one such module 10 is shown in FIG. 6, for purposes of clarity. The Gateway 3 also incorporates an Ethernet-to-TDM (E2T) module 11 connected to LAN 7 for converting TDM based signals to Ethernet packets, and vice versa. An MVIP bus 13 interconnects the various modules. The NCE devices are connected via the LAN 7, as discussed above. Access Point 5 may also be provided where the NCE devices are wireless.

A software application 15 embodies Gateway Call Control 16 which communicates with CD 1 via drivers 17, using the same protocol that a multi-line set uses. Messages received from CD 1 are interpreted by the Gateway Call Control 16 to determine what new calls are being presented on which directory numbers or addresses, what calls have been answered, and what calls have been terminated. The Gateway Call Control 16 emulates the same logic as a telephone set for receiving and interpreting messages from the CD 1 and sending messages to the CD 1. Likewise, the Gateway Call Control 16 can answer, terminate, and originate calls using the same sequence that a multi-line set uses to accomplish the same tasks. In summary, the Gateway 3 can access any of the capabilities available to a multi-line set on behalf of any of the New Communications Endpoints (NCEs).

The NCEs communicate with the Gateway 3 using a different type of signaling than is used on CL C. The Gateway 3 stores information concerning the address or directory number each endpoint uses to make and receive calls. It therefore routes call signaling between the New Communications Endpoints (NCEs) and the Communications Device (CD 1), and translates the signaling for the different protocols if necessary. For example, the NCE may use an H.323 signaling protocol, and the Communication Line to the CD 1 may use a proprietary set protocol. The Gateway 3 ensures that messages sent from the CD 1 are translated to H.323 for the NCE, and converts messages from the NCE to the proprietary set protocol for the CD 1.

Figure 7:
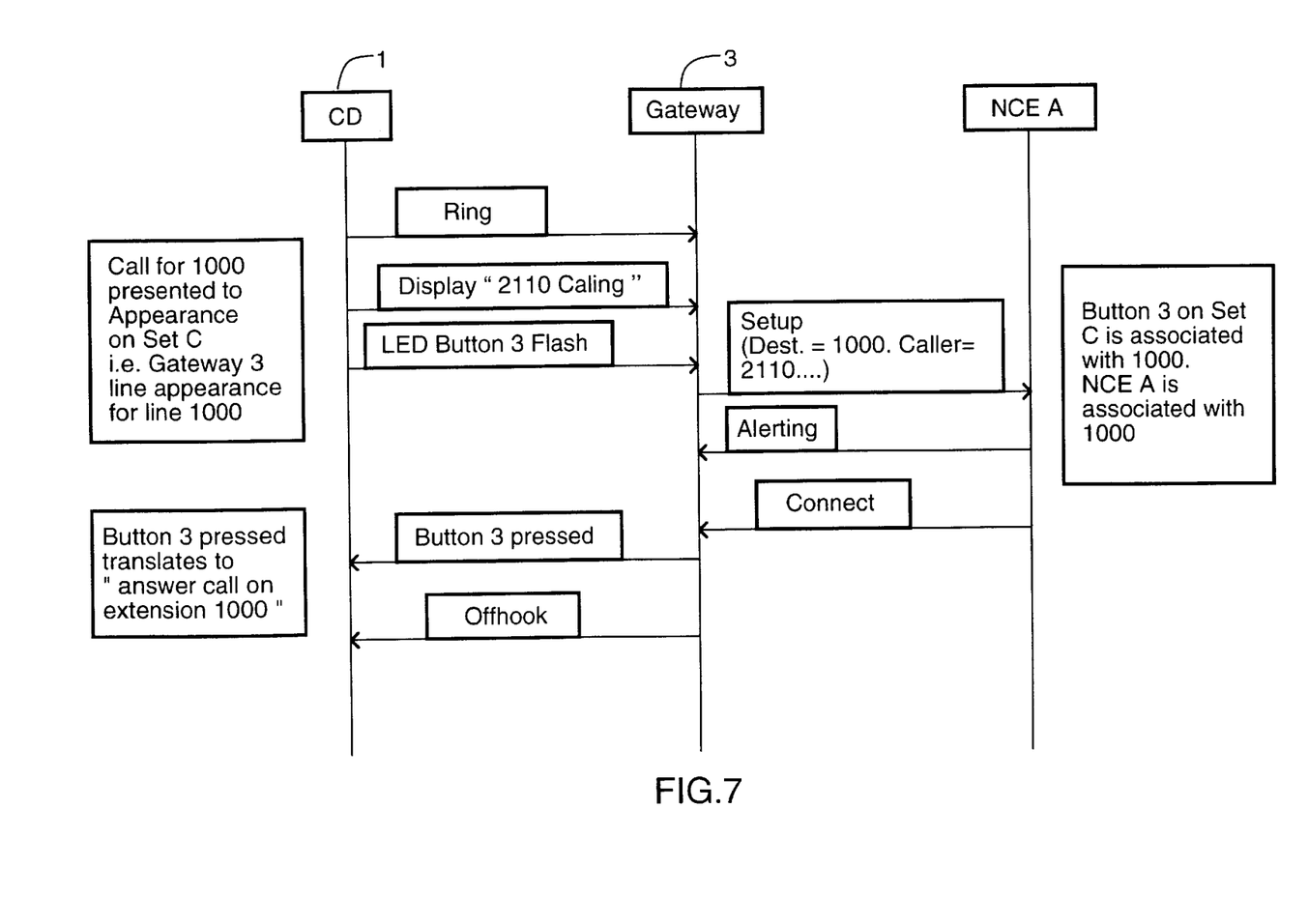
FIG. 7 shows a sequence of communications between various elements for completing a call using the system of the present invention, according to a first example.

With reference to FIG. 7 in combination with FIG. 1, an example is provided of placing a call from a phone at extension 2110 (e.g. CE B connected to CD 1) to a predetermined directory number, 1000, which is one of the lines programmed as a line appearance of CE A on the "set" connected to CL C, represented by the Gateway 3. Consequently, the directory number 1000 is programmed in Gateway 3 to ring NCE A.

(1) CD 1 presents a call to CE A (extension 1000).
(2) CD 1 presents the call to the CE A appearance on "set C", wherein "Set C" is the line CL C connected to the Gateway 3. The message is in the standard form for causing a multi-line set to ring (e.g. a ring message followed by a message to cause the "set" to display "2110 Calling" and cause an LED button associated with line 1000 to flash).
(3) Gateway 3 receives and interprets the message and determines from the portion of the message indicating that LED button 3 is to be flashed, that it is an incoming call for NCE A.
(4) The Gateway 3 sends a setup message to NCE A to indicate an incoming call, thereby causing NCE A to ring, and an appropriate alerting message is returned to Gateway 3.
(5) NCE A user goes offhook, such that NCE A signals a "connect" message to the Gateway 3.
(6) The Gateway 3 formats a message for line C to indicate that CE A has been answered (e.g. "Button 3 pressed" message" followed by an "off hook" message on CL C).
(7) CD 1 stops ringing CE A and connects a speech path from the caller to CL C, whereupon the Gateway 3 connects CL C to the E2T module 11 (FIG. 6) which in response converts speech between TDM format and Ethernet packets and transmits the packets to and receives packets from NCE A.

Figure 8:
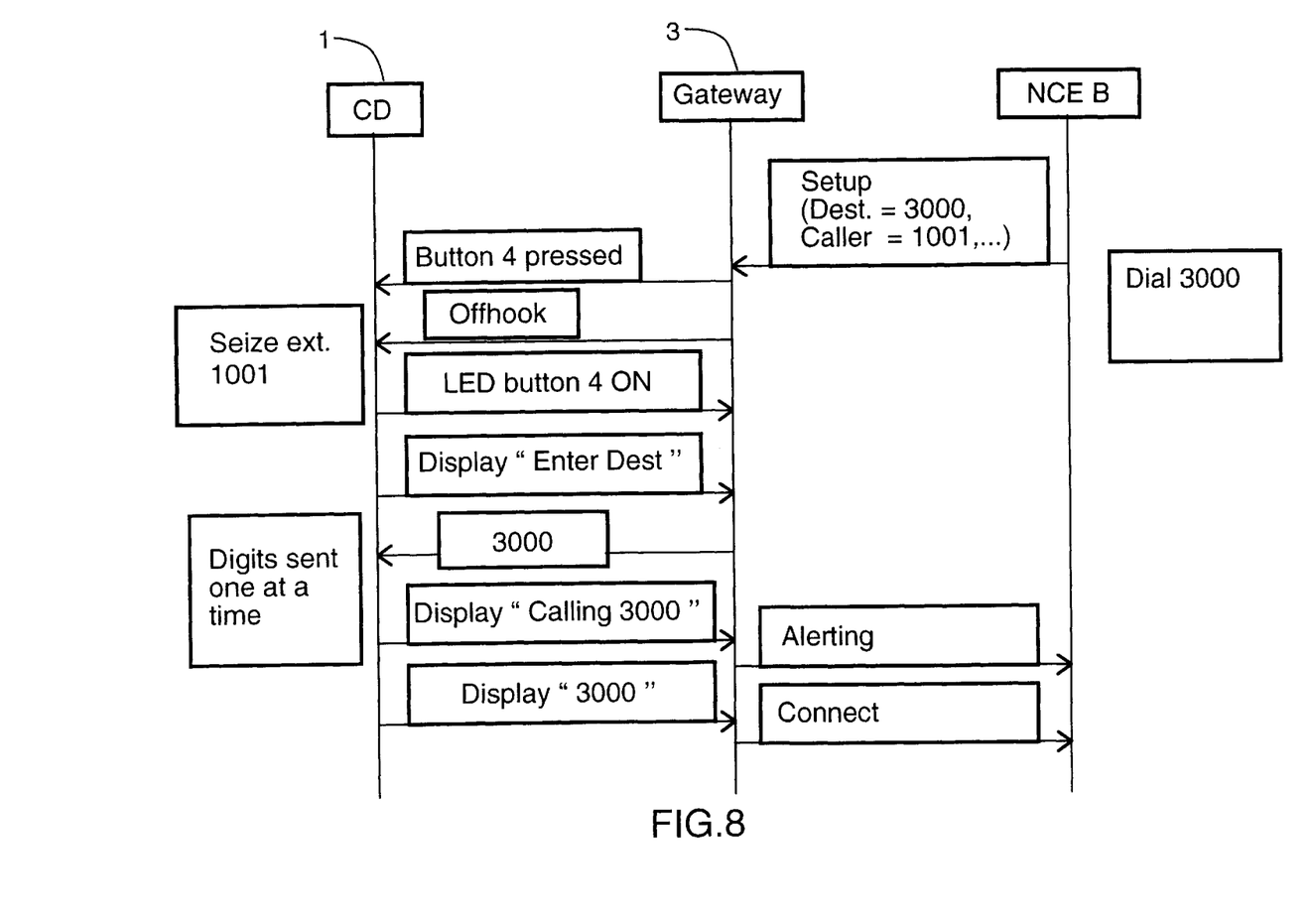
FIG. 8 shows a sequence of communications between various elements for completing a call using the system of the present invention, according to a second example.

Another example is set forth with reference to FIG. 8, in conjunction with FIG. 1, of placing a call from a phone at extension 1001 (e.g. NCE B connected to Gateway 3) to a predetermined directory number (e.g. 3000), which is one of the lines connected to CD 1 (e.g. CE A). As discussed above, extension 1001 is programmed as a line appearance of CE B (e.g. Button 4) on the "set" connected to CL C, represented by the Gateway 3. Consequently, the directory number 1001 is programmed in Gateway 3 to ring NCE B.

(1) A user at NCE B dials the extension 3000, in response to which NCE B sends a setup message (Dest.=3000, Caller=1001, . . . etc.) to Gateway 3 in accordance with the particular protocol used for communication between the Gateway 3 and devices connected thereto (e.g. H.323 protocol, etc.)

(2) Gateway 3 generates a message to CD 1 for indicating that the line appearance at 1001 wishes to place an outgoing call (e.g. a "Button 4 pressed" message), followed by an Offhook message.

(3) CD 1 receives and interprets the message and determines from the portion of the message indicating that button 4 has been pressed, that the line appearance at extension 1001 wishes to originate a call.

(4) CD 1 sends an "LED button 4 ON" display message and an "Enter Dset" display message to the Gateway 3.

(5) Gateway 3 returns the extension 3000 to CD 1 one-digit-at-a-time.

(6) CD 1 then generates a "Calling 3000" display message which is received by the Gateway 3.

(7) Gateway 3 then sends an "alerting" message to NCE B to let the caller know that the call is proceeding.

(8) CD 1 then generates and transmits a display "3000" message to the Gateway 3.

(9) Finally, the Gateway 3 sends a "connect" message to NCE B and connects a speech path between the caller at NCE B and extension 3000 via the E2T module 11 (FIG. 6).

It will be appreciated that, although a particular embodiment of the invention has been described and illustrated in detail, various changes and modifications may be made. All such changes and modifications may be made without departing from the sphere and scope of the invention as defined by the claims appended hereto.

What is claimed is:

1. A communication system comprising:

a communication device for presenting call messages to initiate communications between a plurality of endpoints;

a plurality of new communications endpoints having predetermined logical locations; and a Gateway connected firstly to said communication device via at least one communication line for carrying TDM signals and being capable of supporting multi-line devices and secondly to said plurality of new communications endpoints via a LAN, for (i) presenting a multi-line appearance to said communication device, (ii) receiving said call messages identifying predetermined ones of said multi-line devices, and in response (iii) routing calls between said communication device and said new communications endpoints by translating between said multi-line devices identified in said call messages and corresponding ones of said predetermined logical locations.

2. The communication system of claim 1, wherein said logical locations are one of either IP addresses or directory numbers.

3. The system of claim 1, wherein said Gateway further includes at least one interface module for connection to said at least one communication line, at least one module for converting between said TDM signals carried by said communication line and Ethernet packets carried by said LAN, a high speed bus for connecting said at least one interface module to said at least one module, and a call controller connected to said at least one interface module for communicating with said communications device using a multi-line set protocol and to said module for communicating with said new communications endpoints via IP protocol.

4. The system of claim 3, wherein said high-speed bus is an MVIP bus.

5. The system of claim 1, wherein said new communication endpoints are IP phones.

6. The system of claim 1, wherein said new communications endpoints are wireless telephones which communicate with said Gateway through a common access point.

* * * * *